United States Patent [19]

Cummins

[11] 4,361,310
[45] Nov. 30, 1982

[54] QUICK RELEASE DRAIN PLUG

[76] Inventor: J. Warren Cummins, 5616 Spring Valley, Apt. 120, Dallas, Tex. 75240

[21] Appl. No.: 203,604

[22] Filed: Nov. 3, 1980

[51] Int. Cl.³ .......................... F16K 51/00; F16K 1/16
[52] U.S. Cl. ..................................... 251/144; 251/93; 251/299; 184/1.5; 137/351
[58] Field of Search ........................ 184/1.5; 251/144; 137/351; 251/299, 300, 93

[56] References Cited

U.S. PATENT DOCUMENTS

| | | | |
|---|---|---|---|
| 903,606 | 11/1908 | Pollock | 251/299 |
| 1,464,745 | 8/1923 | Campbell | 251/144 X |
| 1,626,089 | 4/1927 | Jakosky | 251/144 |
| 3,103,341 | 9/1963 | Moran | 251/144 |
| 3,477,459 | 11/1969 | Schossow | 184/1.5 |
| 3,677,369 | 7/1972 | Schramm | 251/144 |
| 4,298,182 | 11/1981 | Balch | 251/144 X |

Primary Examiner—A. Michael Chambers
Attorney, Agent, or Firm—Dennis T. Griggs

[57] ABSTRACT

A drain valve assembly for attachment to the threaded drain opening of an automobile crankcase is disclosed. A drain plug, which is engageable with the threaded drain opening of the automobile crankcase, is provided with an axially extending bore which defines a drain passage in communication with the crankcase. A counterbore formed in the tightening head of the drain plug defines a valve seat. An anchor plate is fastened to the underside of the crankcase by the drain plug. A valve release plate is moveably coupled to the anchor plate for movement from a valve closed position to a valve open position. A resilient, compressible valve head is mounted on the valve release plate for movement into and out of sealing engagement with the valve seat in the valve closed and valve open positions, respectively. The valve release plate is secured to the anchor plate by at least one fastener, such as a stud having a spiral cam engageable with a spring wire carried by the anchor plate, and is manually releasable to permit movement of the release plate to the valve open position for drainage of the crankcase.

2 Claims, 6 Drawing Figures

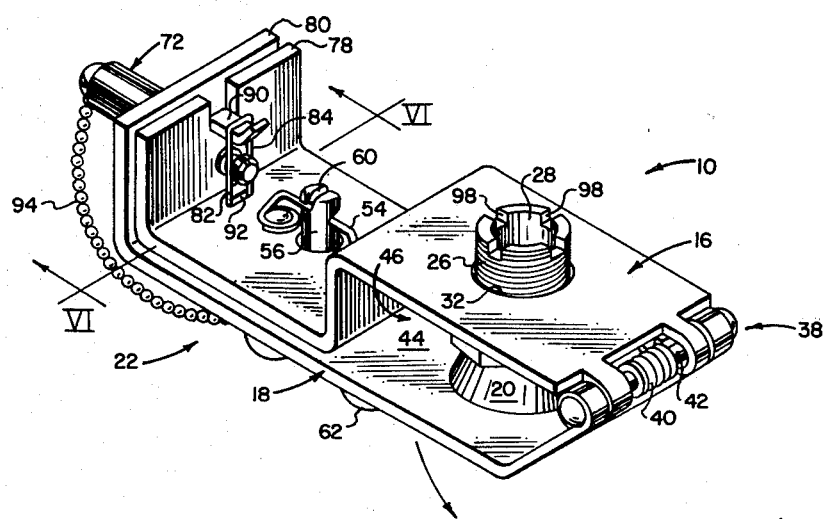
FIG. 4
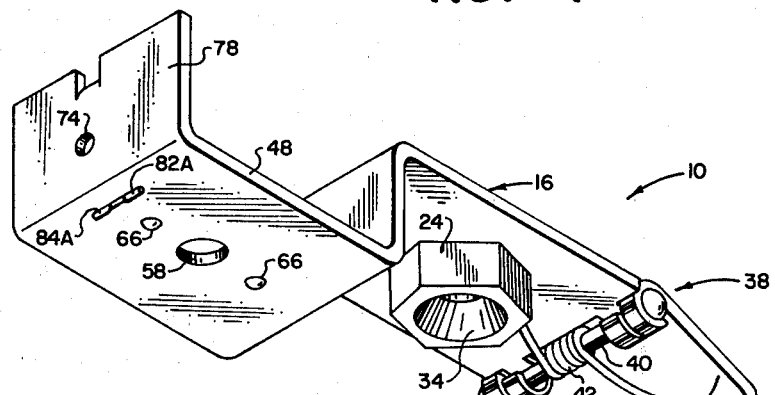
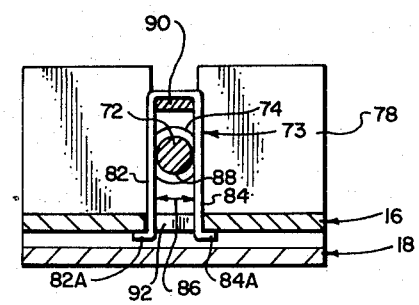
FIG. 6
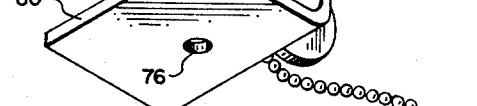
FIG. 5
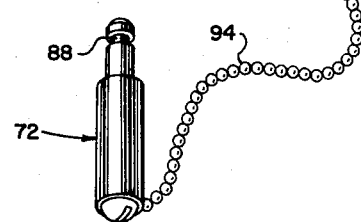

QUICK RELEASE DRAIN PLUG

BACKGROUND OF THE INVENTION

1. Field of the Invention

The invention relates generally to manually operable drain valves for liquid containers, and in particular to a drain valve assembly for attachment to the threaded drain opening of an automobile crankcase.

2. Description of the Prior Art

According to conventional practice, oil is drained from the sump of an automobile crankcase by removing a drain plug and allowing the oil to discharge by gravity flow into a drain pan. This procedure is best carried out with the automobile supported overhead on a hydraulic lift. The drain plug is a male threaded plug having an integral tightening head portion, with the diameter of the tightening head being larger than the plug portion and usually formed in a hexagon configuration for engagement by a wrench. Considerable torque must be applied to tighten or remove the drain plug. Anyone who has changed the oil in their automobile will confirm that the drain plug removal procedure usually results in a large amount of oil being splashed onto the wrench and onto the operator's hands, and sometimes onto the floor or ground. This situation can be extremely dangerous, especially if the oil is hot.

Moreover, the drain plug will be at the same temperature of the oil, and is thus difficult to handle by hand. The drain plug is small, and if dropped onto a hard surface, its threads can be damaged. It is likewise easy to drop the drain plug into the drain pan or onto the floor where it may roll away and become lost.

An additional problem in handling a conventional drain plug is the risk of cross-threading the plug or over-torquing the plug and stripping the drain hole threads as it is reinserted into the crankcase.

It is particularly difficult to remove the drain plug from the crankcase without the use of a hydraulic lift since the clearance between the crankcase and ground level is very small. Moreover, in some engine arrangements, the drain plug is in a relatively inaccessible location, which limits the stroke range of back-and-forth manipulations required for tightening or loosening the drain plug. It will be appreciated that the job of removing and reinserting the drain plug is complicated in such situations by the fact that the drain plug cannot be seen by the operator unless he is directly beneath it, and in some cases only with the aid of a light.

OBJECTS OF THE INVENTION

It is, therefore, the principal object of the present invention to provide a drain plug assembly which is directly interchangeable with a standard drain plug which can be quickly opened and closed by hand without the assistance of tools.

Another object of the invention is to provide a crankcase drain valve assembly having a manually operated valve element which does not utilize threads.

Another object of the invention is to provide a threadless drain plug which closes tightly to prevent leakage and is secured against vibration.

A related object of the invention is to provide a manually operable drain valve assembly in which the valve closure element is secured against loss or damage due to dropping.

Another object of the invention is to provide a drain plug assembly which can be opened and closed without physically touching the valve closure element.

Yet another object of the invention is to provide a crankcase drain valve assembly which can be securely closed and fully opened without the use of tools and without exposing the operator to the risk of burn damage due to splashing of oil as the drain valve closure member is released.

A further object of the invention is to provide a crankcase drain assembly which can be operated by hand without the use of tools and which allows complete drainage of used oil from the crankcase.

SUMMARY OF THE INVENTION

The foregoing objects are achieved by a drain valve assembly which is completely interchangeable with a drain plug of the type received in threaded engagement with the drain opening of a fluid container. According to an important feature of the invention, the drain valve assembly includes a drain plug having a threaded shaft for engaging the threaded drain opening of the fluid container, a tightening head formed on one end of the shaft, a bore extending axially through the shaft and head defining a drain passage, and a counterbore formed in the tightening head defining a valve seat. Additionally, a closure member is coupled to the drain plug for movement into and out of sealing engagement with the valve seat.

In a preferred embodiment, the drain valve assembly includes mutually engageable fastening means carried by ably coupled to the anchor plate for movement from a valve closed position to a valve open position. A valve closure member is secured to the valve release plate for movement into and out of sealing engagement with the valve seat in the valve closed and valve open positions, respectively. The anchor plate is secured to the sidewall of the container by the crankcase drain plug, and mutually engagable fastening means are carried by the anchor plate and by the valve release plate for maintaining the valve closure member in sealing engagement with the valve seat when the release plate is in the valve closed position, and is manually disengagable to permit movement of the release plate to the valve open position for drainage of the container.

The novel features which characterize the invention are defined by the appending claims. The foregoing and other objects, advantages and features will hereinafter appear and for purposes of illustration of the invention, but not of limitation, an exemplary embodiment of the invention is shown in the appended drawings.

BRIEF DESCRIPTION OF THE DRAWINGS

FIG. 4 is a perspective view of the drain valve assembly in the valve closed position.

FIG. 5 is a perspective view of the drain valve assembly in the valve open position.

FIG. 6 is a sectional view of a fastener assembly taken along the lines VI—VI of FIG. 4.

DETAILED DESCRIPTION OF THE PREFERRED EMBODIMENTS

Figure 1:
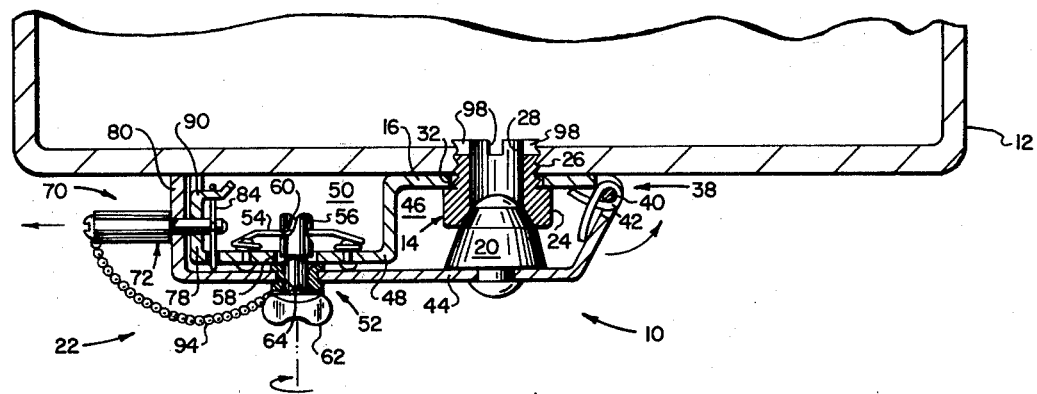
FIG. 1 is a sectional view which illustrates a drain valve assembly attached to the threaded drain opening of an automobile crankcase in the valve closed position.

In the description which follows, like parts are marked throughout the specification and drawing with the same reference numerals, respectively. The figures are not necessarily drawn to scale and, in some instances, portions have been exaggerated in order to more clearly depict certain features of the invention.

Figure 2:
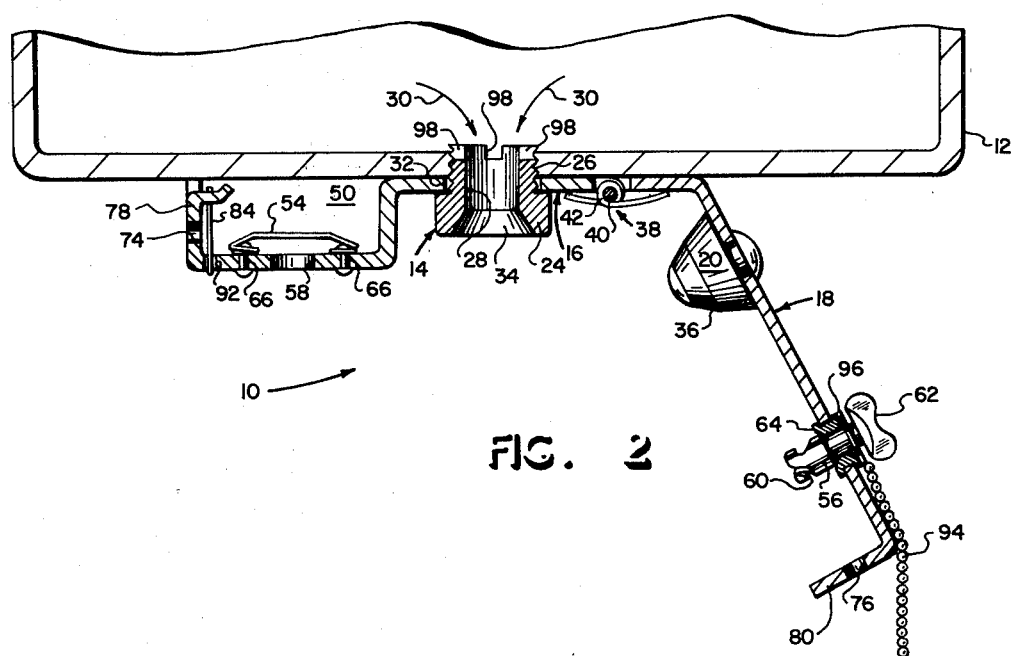
FIG. 2 is a view similar to FIG. 1 illustrating the drain valve assembly in the valve open position.

Referring now to FIGS. 1 and 2, a drain valve assembly 10 is shown assembled to the crankcase 12 of an internal combustion engine. FIG. 1 illustrates the assembly in the closed valve position, and FIG. 2 illustrates the assembly in the open valve position. The principal components of the drain valve assembly 10 are a drain plug 14, an anchor plate 16, a valve release plate 18, a valve closure member 20, and a fastener assembly 22.

The drain plug 14 is properly dimensioned so that it is completely interchangeable with a conventional drain plug of the type commonly used on an automobile crankcase. The drain plug 14 is provided with a hexagon-shape tightening head 24 and a threaded male plug portion 26. According to the invention, the threaded male plug portion 26 is provided with a bore 28 which extends axially through the threaded plug 26 and the tightening head 24, thereby defining a drain passage through which oil is discharged by gravity flow as indicated by the arrows 30.

The drain valve assembly 10 is secured to the underside of the crankcase 12 by the drain plug 14 which extends through an opening 32 in the anchor plate. The drain plug 14 is threaded into engagement with the threaded opening of the crankcase 12 and as torque is applied, the anchor plate 16 is compressed and securely fastened in place.

The valve release plate 18 is moveably coupled to the anchor plate 16 for movement between the valve open and valve closed positions. The valve closure member 20 is securely fastened to the release plate 18 and is carried into and out of engagement with the drain plug 14 as the release plate 18 is rotated clockwise and counterclockwise, respectively.

According to an important feature of the invention, the tightening head 24 of the drain plug is provided with a counterbore 34 which is tapered with respect to the drain passage 28, thereby defining a conical valve seat. The valve closure member 20 is provided with a tapered sidewall 36 which engages the counterbore 34 in the closed valve position. To insure a reliable fluid seal, the valve closure member 20 is preferable constructed of a resilient, compressible material such as Neoprene (Chloroprene) having a durometer in the hardness range of 30-95, or Nitrile (Butadiene Acrylonitrile) having a durometer in the hardness range of 40-95. However, other elastomers, such as natural rubber or synethic rubber which have been stabilized for high temperature duty and which are non-reactive with petroleum products, may be used to good advantage.

Referring now to FIGS. 2 and 5, the release plate 18 is pivotally coupled to the anchor plate 16 by a hinge assembly 38 which includes a pivot pin 40. According to an important feature of the invention, a bias spring 42 is mounted around the pivot pin 40 and applies a yieldable force against the release plate thereby urging it toward the valve open position as shown in FIGS. 2 and 5. According to this arrangement, the bias spring 42 holds the release plate 18 outside of the drainage path when the release plate is in the valve open position, thereby avoiding contact with the oil stream.

As can best be seen in FIGS. 1 and 4, the release plate includes a panel 44 which is axially offset with respect to the anchor plate thereby defining a sealing compartment 46 in the valve closed position. The offset panel portion 44 is angularly displaced, preferably by an angle greater than a right angle, whereby the valve closure member and the associated fastening means stand clear of the drainage path when the release plate is in the valve open position.

According to an important object of the invention, the drain valve assembly 18 can be quickly opened and closed by hand without the assistance of tools. This object is carried out by the fastener assembly 22 which includes mutually engageable fastening means carried by the anchor plate and by the valve release plate for maintaining the valve closure member in sealing engagement with the valve seat in the valve closed position, and which can be manually released to permit movement of the released plate to the valve open position when drainage is desired.

It will be appreciated that the integrity of the seal formed by the engagement of the valve closure member 20 with the valve seat 34 is of utmost importance, and that an advertent release of the drain valve assembly could cause severe damage to the automobile engines if the oil were lost during operation. At the same time, for the reasons outlined above, it is a matter of considerable convenience to be able to open and close the drain valve assembly 10 by hand and without the assistance of tools. The fastener assembly 22 is manually operated without the assistance of tools and provides for easy disengagement of the valve closure member when drainage is desired, and provide secure, reliable sealing engagement in the valve closed position.

According to an important feature of the invention, the anchor plate 16 is provided with an axially offset panel 48 which in combination with the underside of the crankcase 12 defines a latching chamber 50. Reliable latching engagement is provided by a first latching assembly 52 which includes a spring wire 54 anchored to the underside of the offset anchor plate panel 48 and a stud 56 rotatably mounted on the offset portion 44 of the release plate. The release plate is provided with an access opening 58 through which the stud 56 projects when the drain valve assembly is in the closed position, and the stud is provided with a spiral cam 60. As can best be seen in FIG. 1, the spiral cam 60 is disposed in interlocking engagement with the wire spring 54 in response to clockwise rotation of the stud 56. A wingnut 62 is attached to the outside end of the stud 56 for manually locking and unlocking the fastener assembly 52 by clockwise and counterclockwise rotation of the stud 56.

Figure 3:
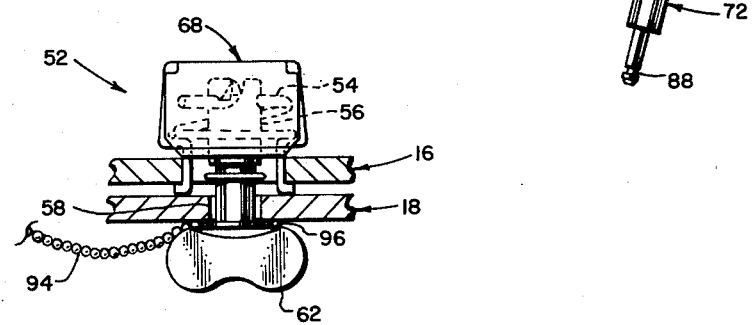
FIG. 3 is an alternate embodiment of a fastener assembly shown in FIG. 1 and FIG. 2.

As can best be seen in FIGS. 1 and 2, the stud 56 is rotatably coupled to the release plate 18 by a collar bushing 64. The spring wire 54 is secured to the underside of the offset anchor panel 48 by rivets 66. However, other arrangements, such as shown in FIG. 3 in which the spring wire 54 and stud 56 are enclosed within a clip 68, can be used to good advantage.

Although the fastener assembly 52 is extremely reliable under adverse conditions associated with automobile driving, a second fastener assembly 70 provides a redundant backup to insure that inadvertent release will not occur. The fastener assembly 70 includes a lock pin 72 and a spring wire 73 which are received within the latch compartment 50 in releasable, interlocking engagement with the anchor plate 16 and the release plate 18. According to this arrangement, access openings 74, 76 are formed in end panels 78, 80 of the anchor plate and release plate, respectively. These access openings are aligned with each other in the valve closed position, and receive the lock pin 72.

As can best be seen in FIGS. 4 and 6, the spring wire 73 includes laterally spaced leg portions 82, 84 which define a restricted keyway 86 which is aligned with the access openings 74, 76. The lock pin is provided with an annular groove 88 which defines a detent which is releasably engageable with the spring wire portions 82, 84 when the lock pin is inserted through the access openings 74, 76 and into the restricted keyway 86. The spring wire 73 is retained in place by a tang 90 and by the offset anchor panel 48.

In this arrangement, the spring wire 73 is formed in a rectangular loop, with the legs 82 and 84 being inserted through a slot 92 and the central portion of the loop engaging the tang 90. Preferably, at least a portion of the tan 90 is angled upwardly at approximately 45 degrees to prevent slipping movement of the spring wire 73 as the lock pin 72 is inserted. The spring wire 73 is anchored in place at the lower end of its legs 82, 84 by outwardly protecting end portions 82A, 84A. Additionally, the lock pin 72 is secured to the release plate 18 by a chain 94, one end of which is attached to the lock pin 72, and the other end being attached to a washer 96 which is retained by the stud 56.

When it is desired to drain the crankcase 12, the lock pin 70 is withdrawn from the keyway 86, and the stud fastener 56 is rotated in the counterclockwise direction to release the spring wire 54. Both of these operations are carried out by hand and without the assistance of tools. Moreover, this release operation can be conveniently carried out with the limited amount of space available when the car is on the ground, so that a hydraulic lift is not required. After a suitable drain pan has been placed beneath the drain valve assembly 10, the release plate 18 is rotated in the counterclockwise direction, thereby allowing oil to drain from the crankcase 12 by gravity flow through the passage 28.

To ensure that all of the oil in the crankcase is drained, the end of the threaded plug 26 is intersected by radially extending drainage slots 98 which have a depth extending at least flush with the bottom of the crank case 12, and preferably slightly below the bottom of the crankcase 12. According to this arrangement, all of the oil in the crankcase, including the relatively heavy, sediment laden oil on the bottom of the crankcase can be drained away, especially when the oil is hot.

It will be appreciated from the foregoing description that the crankcase drain valve assembly 10 is manually operable without the use of tools and which provides a reliable seal with a threadless closure which closes tightly to prevent leakage and which is secured against inadvertent release by manually operable fasteners. Moreover, the drain valve assembly can be released to permit drainage without physically touching the sealing means, thereby avoiding oil spills and splashing which could cause personal injury or property damage.

Although preferred embodiments of the invention have been described in detail, it should be understood that various changes and alterations can be made therein without departing from the spirit and scope of the invention as defined by the appended claims.

What is claimed is:

1. A drain valve assembly for attachment to the threaded drain opening of an automobile crankcase comprising, in combination:

an anchor plate for engaging the crankcase, said anchor plate having an opening for receiving the shaft of a crankcase drain plug;

a crankcase drain plug having a threaded shaft extending through the anchor plate opening for engaging the threaded crankcase drain opening and compressing said anchor plate against the crankcase as said drain plug is tightened in the threaded crankcase drain opening, a tightening head formed on one end of said threaded shaft, a bore extending axially through said shaft and tightening head defining a drain passage, and a counterbore formed in said tightening head defining a valve seat;

a valve release plate pivotally coupled to said anchor plate for movement from a first position in which said valve release plate is overlying said drain passage to a second position in which said valve release plate is standing clear of said drain passage;

a valve closure member mounted onto said valve release plate, said valve closure member being moved into and out of sealing engagement with said valve seat in response to movement of said valve release plate to and from said first and second positions, respectively;

mutually engagable fastening means secured to said anchor plate and to said valve release plate for maintaining said valve closure member in sealing engagement with said valve seat when said release plate is in the first position, said fastening means being manually releasable to permit movement of said release plate to the second position for drainage of the crankcase; and, said anchor plate having an offset panel portion defining a latch compartment, said panel portion having an access opening, said mutually engagable fastening means including a spring wire received within said latch compartment and secured at opposite ends to said anchor plate, said spring wire overlying said access opening and a stud fastener rotatably mounted on said releast plate and insertable into said access opening when said release plate is in the valve closed position, said stud fastener having a spiral cam for locking engagement with said spring wire.

2. The drain valve assembly as defined in claim 1, said release plate having an access opening aligned with the anchor plate access opening in the second position, said mutually engagable fastening means comprising:

a spring wire received within said latch compartment and secured to said anchor plate, said spring wire including laterally spaced leg portions defining a restricted keyway aligned with said access opening; and, a lock pin insertable into the access openings and the restricted keyway, said lock pin having an annular groove on its distal end for detented engagement with said spring wire leg portions in the restricted keyway.

* * * * *